United States Patent
Ahmed et al.

(10) Patent No.: US 6,939,582 B2
(45) Date of Patent: *Sep. 6, 2005

(54) COATED COMPOSITE HIGH VOLTAGE ELECTRICAL INSULATOR

(75) Inventors: Farooq Ahmed, Guelph (CA); Faisal Huda, Toronto (CA); Seraj ul Huda, Toronto (CA); John Barr, Eden Mills (CA)

(73) Assignee: CSL Silicones Inc., Guelph (CA)

( * ) Notice: Subject to any disclaimer, the term of this patent is extended or adjusted under 35 U.S.C. 154(b) by 65 days.

This patent is subject to a terminal disclaimer.

(21) Appl. No.: 10/445,871

(22) Filed: May 28, 2003

(65) Prior Publication Data

US 2004/0006169 A1 Jan. 8, 2004

Related U.S. Application Data

(63) Continuation-in-part of application No. PCT/CA02/01920, filed on Dec. 16, 2002, which is a continuation-in-part of application No. 10/014,790, filed on Dec. 14, 2001, now abandoned.

(51) Int. Cl.$^7$ ................................................ B05D 3/02
(52) U.S. Cl. .................................................... 427/387
(58) Field of Search .......................................... 427/387

(56) References Cited

U.S. PATENT DOCUMENTS

| | | | | | |
|---|---|---|---|---|---|
| 3,464,951 | A | * | 9/1969 | Hittmair et al. | ............ 524/864 |
| 4,822,830 | A | * | 4/1989 | Adkins | ........................ 523/203 |
| 4,898,910 | A | * | 2/1990 | Kamis et al. | ................ 524/869 |
| 5,023,295 | A | * | 6/1991 | Bosch et al. | ................. 524/783 |
| 5,326,804 | A | * | 7/1994 | Mistry et al. | ................ 524/188 |
| 6,437,039 | B1 | * | 8/2002 | Ahmed et al. | ............... 524/492 |

* cited by examiner

Primary Examiner—Brian K. Talbot

(57) ABSTRACT

The present invention relates to polymer based composition high voltage insulator having a monolithic coating of a one-part room temperature vulcanizable organopolysiloxane rubber composition which crosslinks in the presence of moisture. The one-part organopolysiloxane rubber composition comprises the product which is obtained by mixing from about 20 to about 60 weight percent of one or more polydiorganosiloxane fluids, from 0 to about 40 weight percent of a cyclo-organosiloxane, of the formula $[(R)_2 SiO]_n$, from 0 to about 40 weight percent of an inorganic extending or non-reinforcing filler, from about 0.5 to about 15 weight percent of an amorphous $SiO_2$ reinforcing filler having a surface area of between about 100 to 250 m$^2$/g and a particle size range between about 0.01 and 0.03 microns from about 1 to about 10 weight percent of an oximinosilane cross-linking agent.

9 Claims, No Drawings

COATED COMPOSITE HIGH VOLTAGE ELECTRICAL INSULATOR

CROSS-REFERENCE TO RELATED APPLICATIONS

This application is a continuation-in-part of PCT/CA02/01920 filed Dec. 16, 2002, which is a continuation-in-part of Ser. No. 10/014,790, filed Dec. 14, 2001, now abandoned both pending.

FIELD OF THE INVENTION

This invention relates to a method for refurbishing composite high voltage electrical insulators by coating the entire surface of the insulator with a monolithic one-part room temperature vulcanizable organopolysiloxane rubber composition that does not contain volatile organic compounds (VOC) and which crosslinks in the presence of moisture to form a coating to protect the composite high voltage insulators from environmental effects.

BACKGROUND OF THE INVENTION

Electrical insulators for high voltage use have traditionally been made of glass or porcelain as these materials are of low cost, high quality electrically and under normal conditions, have a long life in service. However, at higher voltages, the size and weight of glass or porcelain becomes excessive. A number of composite insulators made from lighter weight polymeric materials have been developed for use in such high voltage installations. Such composite insulators generally include a fiberglas rod having a number of weathersheds constructed of a highly insulating polymeric material attached to the rod along its length.

Since the 1970's, advancements in high voltage insulator technology have been made by introducing new, lightweight polymer materials for the manufacture of insulators- replacing the heavier and more brittle porcelain and glass materials conventionally used in the manufacture of insulators. These new polymer materials include Silicone, EPDM, ESP, EPR, Bisphenol Epoxy and Cycloaliphatic Epoxy polymers.

Although they offer the advantages of reduced weight and mechanical flexibility, insulators made from any of these polymers have demonstrated failure and inconsistent performance when subjected to normal field phenomena such as environmental weathering, UV exposure, exposure to industrial pollution, exposure to salt fog and salt spray, electrical tracking, corona discharge and electrical arcing. Unlike this new technology, the older porcelain/glass technology is extremely reliable. Insulators made of porcelain/glass have a minimum lifespan of 35 years compared to inconsistent lifespans of only 2 to 20 years with polymer-based composite insulators.

The primary modes of failure of polymer-based composite insulators are erosion of the polymer material, splitting/cracking of the polymer material and brittle fracture of the supporting fiberglass core (due to the interface of dissimilar materials; polymer and fiberglass). Loss of hydrophobicity is also a common mode of failure, particularly in insulators made of non-silicone polymers. These non-silicone polymer-based composite insulators have thus not gained much acceptance in the market, despite their substantially lower cost compared to silicone polymer-based composite insulators and porcelain/glass insulators.

An insulator such as the suspension insulator in a high voltage power transmission line is designed to keep to a minimum current discharges under normal conditions. However, when the insulator surface becomes contaminated, leakage current can develop along the surface of the insulator. The amount of this leakage current depends upon the voltage stress and the conductivity of the film of contaminant on the surface of the insulator. These leakage currents can incur or cause arcing on the surface of the insulator which can have serious effects upon the composite insulator surface such as the formation of free carbon and non volatile semi-conductor materials and may eventually result in a conducting path forming across the surface of the insulator effectively shorting out the insulator.

The outer surface of an electrical insulator is the most important part of the insulator as this is the part of the insulator that is subjected to the effects of electrical voltage stress, leakage currents and weathering. When the surface of a high voltage insulator is exposed to moisture such as rain or fog in combination with contaminated atmospheres as are found in industrial locations may be subject to extensive corrosion unless protected in some way from exposure to the corrosive atmosphere. Other potentially corrosive environments include along sea coasts where salt spray is found and in areas where agricultural chemicals are widely distributed.

The room temperature curable silicone composition of the present invention used to coat the outer surface of insulators provides for improved insulation that is arc resistant, hydrophobic and resistant to the stresses imposed upon outdoor electrical insulator. The composition provides a coating of electrically non conductive material on the surface of the insulator which protects the underlying insulator material.

SUMMARY OF THE INVENTION

The present invention provides a VOC free, one part room temperature vulcanizable coating for protecting composite insulators. The coating provides for easy and convenient application by conventional methods such as dipping, flow or spraying. The coating provides a guard against environmental effects along with high physical strength and adhesion achieved with a suitable blend of reinforcing and extending fillers.

In one aspect, the present invention provides for a one-part room temperature vulcanizing organopolysiloxane rubber composition for coating a composite high voltage insulator. The composition comprises the product which is obtained by mixing the following:

a) from about 20 to about 60 weight percent of one or more polydiorganosiloxane fluids of the formula

in which R is a monovalent alkyl or alkenyl radical having 1 to 8 carbon atoms or a phenyl radical, R' and R" which may be the same or different are OH or a monovalent alkyl or alkenyl radical having 1 to 8 carbon atoms or a phenyl radical and n has an average value such that the viscosity is from about 10 to about 100,000 centipoise at 25° C., wherein at least one of the polyorganosiloxane fluids has at least one of R' and R" equal to OH and n has an average value such that the viscosity is in the range from 100 to 100,000 centipoise at 25° C., preferably from 1,000 to 40,000 centipoise at 25° C.;

b) from 0 to about 40 weight percent of a cyclo-organosiloxane of the formula

in which R is a monovalent alkyl or alkenyl radical having 1 to 8 carbon atoms or a phenyl radical which may optionally be substituted with an alkyl radical having 1 to 8 carbon atoms and n has an average value of 3 to 10 c) from 0 to about 40 weight percent of an inorganic extending or non-reinforcing filler d) from about 0.5 to about 15 weight percent of an amorphous $SiO_2$ reinforcing filler having a surface area of between about 100 to 250 $m^2/g$ and a particle size range between about 0.01 and 0.03 microns;
the surface of amorphous silica may also be treated with organic molecules such as hexamethyldisilazane or polydimethylsiloxane or silane;

e) from about 1 to about 10 weight percent of an oximinosilane cross-linking agent of the formula;

$$RSi(ON=CR'_2)_3$$

in which R and R' are independently selected from monovalent alkyl or alkenyl radicals having 1 to 8 carbon atoms or a phenyl radical
which may optionally be substituted with an alkyl radical having 1 to 8 carbon atoms;

f) from about 0.2 to about 3 weight percent of an adhesion promoter of the formula $$(R^2O)_{3-b}SiR^1_{\phantom{1}}{}^{R^3_b}$$

in which $R^2$ and $R^3$ are independently selected from monovalent alkyl or alkenyl radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group;

g) from about 0.02 to about 3 weight percent of an organotin salt as a condensation catalyst; and h) from about 20 to about 50 weight percent of alumina trihydrate, the alumina trihydrate having a median particle size of about 10 to about 30 mm, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42.

The present invention also provides for a method of protecting high voltage composition insulators from environmental effects. The method comprises applying to the surface of the insulator a thin layer of the above one-part organopolysiloxane rubber composition and allowing the layer of the one-part organopolysiloxane rubber composition to cure at room temperature to a silicone elastomer.

DETAILED DESCRIPTION OF THE INVENTION

The dilemma of trading off product lifespan and reliability for lightweight insulators is resolved by forming a monolithic layer of silicone rubber around the polymer-based composite insulator from top to bottom, encapsulating the entire insulator and overlapping the metal fittings at each end of the insulator. The protective layer may be formed of High Temperature vulcanizable (HTV) silicone rubber, liquid silicone rubber, 2-part silicone rubber, catalyst cure silicone rubber, RTV silicone rubber or UV cure silicone rubber. In the preferred embodiment, the protective layer is a one-part RTV silicone rubber.

Because it is made of silicone, the resulting smooth layer around the insulator provides protection against the otherwise damaging effects of environmental weathering, UV exposure, hydrolysis, electrical tracking, corona discharge and electrical arcing. The resulting layer also acts to conceal any interface of the dissimilar polymer and fiberglass materials and seals out the ingress of moisture between the polymer and its supporting fiberglass core. Because of its naturally hydrophobic nature, the external layer of silicone creates a highly hydrophobic insulator of very low cost. The resulting insulator is able to withstand well above 1,000 hours of accelerated testing under test method TEC 1109, equivalent to well over 10 years of actual field performance.

Although not so limited, the external silicone layer around the polymer insulator is ideally formed with a low viscosity RTV, HTV or UV cure silicone coating to be applied by spray, brush or dip.

The one-part organopolysiloxane rubber compositions of the preferred embodiment of the present invention are ideally suited for refurbishing composite high voltage electrical insulators to provide protection of the refurbished composite high voltage insulators against corrosion and leakage current cause by the effects of salt spray and chemical environments including direct exposure to salt water, salt fog, gases and other industrial pollutants. The protection afforded by the compositions of the present invention has surprising been found to provide equivalent or in some cases better insulating properties as compared to new composite insulators. The compositions with suitable additives also provide protection against the effects of weathering from exposure to among others UV radiation. The absence of volatile organic components (VOC) in the coating composition makes it environmentally friendly, when large outdoor installations considered such as power transmission lines etc.

The one-part organopolysiloxane rubber compositions of the present invention for use as a protective coating contain about 20 to about 60 weight percent of one or more polydimethylsiloxane fluids of the formula:

$$R''\Theta[(R)_2SiO]_n(R)_2SiR'$$

in which R is a monovalent alkyl or alkenyl radical having 1 to 8 carbon atoms or a phenyl radical, R' and R" which may be the same or different are OH or a monovalent alkyl or alkenyl radical having 1 to 8 carbon atoms or a phenyl radical and n has an average value such that the viscosity is from about 10 to about 100,000 centipoise at 25° C. At least one of the polyorganosiloxane fluids is a higher viscosity siloxane having reaction groups in which at least one and preferably both of R' and R" is equal to OH and n has an average value such that the viscosity is in the range from 100 to 100,000 centipoise at 25° C., preferably from 1,000 to 40,000 centipoise at 25° C. The polydimethylsiloxanes may contain small amounts of monomethylsiloxane units and methyl radical replaced with other radicals in small amounts as impurities such as is found in commercial products, but the preferred fluid contains only polydimethylsiloxane.

The composition may contain a second linear dimethyl polysiloxane of low molecular weight to act as a viscosity reducer for the composition for ease in applying the composition to the surface. The low molecular weight linear dimethyl polysiloxanes are end blocked oligomeric compounds of the above formula where R, R' and R" may be the same or different and are independently selected from a monovalent alkyl or alkenyl radical having 1 to 8 carbon atoms or phenyl radical. The average value of n ranges between 4 and 24, preferably between 4 and 20.

If the composition contains the two different polysiloxanes set out above, the total of the polysiloxanes is generally about 40 to 60 weight percent with the relative amounts of the two polysiloxanes being selected based upon the desired characteristics of the final coating. Generally each of the polysiloxanes will be present in a ratio of from about 30 weight percent to about 70 weight percent based upon the total weight of the polysiloxane fluids.

In addition to, or in place of the low molecular weight linear dimethyl polysiloxanes, the composition may contain up to about 40 weight percent, more preferably 20 to 30 weight percent of a cyclo-organosiloxane of the formula:

[(R)$_2$SiO]$_n$ in which R is a monovalent alkyl or alkenyl radical having 1 to 8 carbon atoms or a phenyl radical which may optionally be substituted with an alkyl radical having 1 to 8 carbon atoms and n has an average value of 3 to 10. The preferred cycloorganosiloxane is a cyclic dimethylsiloxane and is used in a similar manner to the low molecular weight linear dimethyl polysiloxanes to lower the viscosity of the composition for convenient application by spraying, brushing or dipping.

The composition also contains about 20 to about 50 weight percent of alumina trihydrate preferably about 35 to about 50 weight percent, the alumina trihydrate having a median particle size of about 10 $\mu$m to about 30 $\mu$m, preferably about 10 $\mu$m to about 15 $\mu$m containing 65.1 percent Al$_2$O$_3$, 34.5 percent combined H$_2$O, 0.3 percent Na$_2$O, 0.02 percent CaO, 0.01 percent SiO$_2$ and having a specific gravity of 2.42. The amount of filler may be increased within the range to improve the desired properties.

The composition also contains about 0.5 to 15 weight percent of an amorphous SiO$_2$ reinforcing filler having a surface area of between about 100 to 250 m$^2$/g and a particle size range between about 0.01 and 0.03 microns. The specific gravity of the filler is preferably about 2.2. The surface of amorphous silica may also be treated with organic molecules such as hexamethyldisilazane or polydimethylsiloxane or silane.

The composition also contains about 1 to 10 weight percent, preferably 2 to 5 weight percent of an oximinosilane cross linking agent. Preferably the oximinosilane cross linking agent is of the formula RSi(ON=CR'$_2$)$_3$ in which R and R' each represent a monovalent alkyl or alkenyl radical having 1 to 8 carbon atoms or a phenyl radical, preferably an alkyl radical such as methyl, ethyl, propyl, butyl, or an alkenyl radical such as vinyl, allyl, or a phenyl radical. The preferred R and R' are alkyl or vinyl radicals, most preferably methyl and ethyl radicals.

The composition also contains about 0.2 to 3 weight percent of an organo functional silane as an adhesion promoter. Preferably the organo functional silane has the formula $$(R^2O)_{3-b}SiR^1_{\phantom{1}}R^3_b$$

wherein R$^2$ and R$^3$ are independently selected from monovalent alkyl or alkenyl radicals being 1 to 8 carbon atoms or a phenyl radical, b is an integer from 0 to 3, preferably 0, and R$^1$ is a saturated, unsaturated or aromatic hydrocarbon radical being 1 to 10 carbon atoms, which may be further functionalized by a member selected from the group consisting of amino, ether, epoxy, isocyanate, cyano, acryloxy and acyloxy and combinations thereof. R$^2$ and R$^3$ are preferably an alkyl radical such as, for example, methyl, ethyl, propyl, butyl, or an alkenyl radical such as vinyl and allyl. More preferably R$^2$ and R$^3$ are alkyl radicals, most preferably methyl, ethyl or propyl radicals. Preferably R$^1$ is an alkyl group, more preferably further functionalized by one or more amino group. The most preferred organofunctional silane is N-(2-aminoethyl-3-aminopropyl)trimethylsilane.

In all of the above compounds, the alkyl includes straight, branched or cyclic radicals. Among the alkyl groups are C$_{1-8}$ straight or branched-chain alkyl such as, for example, methyl, ethyl, propyl, isopropyl, n-butyl, isobutyl, tert-butyl, pentyl, isopentyl, hexyl, etc., the cycloalkyl are C$_{3-8}$ cycloalkyl such as, for example, cyclopropyl, cyclobutyl, cydohexyl, etc., the alkenyl groups are C$_{1-8}$ alkenyl such as, for example, vinyl and allyl. The above groups a well as the phenyl radicals may be further functionalized by including in the chain or ring structure, as the case may be, a group selected from the class consisting of amino, ether, epoxy, isocyanate, cyano, acryloxy, acyloxy and combinations, so long as the functionalization does not adversely affect the desired properties of the compound.

The composition additionally contains about 0.02 to 3 weight percent of an organotin salt of a carboxylic acid as a condensation catalyst, which accelerate the aging of the composition. Preferably the organotin salt is selected from the group dibutyltin diacetate, stannous octoate, dibutyltin dioctoate and dibutyltin dilaurate. Most preferably the organotin salt is dibutyltin dilaurate of the formula:

(C$_4$H$_9$)$_2$Sn(OCOC$_{10}$H$_{20}$CH$_3$)$_2$.

The composition may contain other optional ingredients such as pigments and other fillers in minor amounts provided that the addition of the ingredients does not cause degradation of the desired properties of the cured coating made from the composition. One commonly utilized optional ingredient is a pigment, preferably a gray pigment, most preferably present in amounts up to about 1 weight percent.

The organopolysiloxane composition of the present invention is prepared by mixing the ingredients together in the absence of moisture. The silane is moisture sensitive and will undergo cross-linking in the presence of moisture such that the mixture must be essentially absent of free moisture when the silane is added and maintained in a moisture free state until cure is desired.

A preferred method of mixing comprises mixing the polysiloxane polymer fluids with the reinforcing filler. Thereafter, the organosilicone cross-linking agent and the adhesion promoter are added under a nitrogen atmosphere. The alumina trihydrate is thereafter added in stages and mixed, and the solvent added to the mixture under a nitrogen atmosphere. Finally, the condensation catalyst is added to the mixture.

The improved refurbished coated composite insulator of the present invention is capable of operating under a higher voltage stress in the presence of moisture such as rain or fog in combination with contaminated atmospheres such are as found in industrial locations, along sea coast where salt spray is found and in areas where agricultural chemicals are widely distributed.

The surface to be protected is coated with the composition by conventional methods such as dipping, brushing or spraying. Preferably, the surface to be protected is coated by spraying one or more applications of the composition of the present invention. The composition may be adjusted to the consistency suitable for use in these methods by the adjustment of the amount of low molecular weight polysiloxane viscosity reducer utilized in the composition or may be heated for spray application. The thickness of the coating will depend upon the specific requirements of the application and the desired level of protection. The coating generally has an average thickness of 250 to 1500 microns more preferably, an average thickness of 200 to 1000 microns, most preferably about 200 to 750 microns. After the coating is formed on the surface, the surface is exposed to normal atmosphere for cross-linking and cure of the coating.

The following examples are included to illustrate preferred embodiments of the invention and to demonstrate the usefulness of the coating and are not intended to limit in any way the scope of protection for the invention.

EXAMPLE 1

A first composition for coating electrical insulators was prepared by mixing 30 parts by weight of dimethyl polysiloxane fluid having a viscosity of 20,000 centipoise at 25° C. and 20 parts by weight of cyclic dimethyl siloxane then adding 2 parts by weight of surface treated amorphous silica (surface treated with hexamethyldisilazane) having a specific gravity of 2.2 and surface area of about 150 $m^2/g$. Then 2 parts by weight of methyl tris-(methyl ethyl ketoxime) silane and 1 part by weight of N-(2-aminoethyl-3 aminopropyl)trimethoxy silane are added and mixed under nitrogen atmosphere. Then 35 parts by weight of alumina trihydrate are added and mixed well to uniform consistency. The viscosity of the mixture was checked and adjusted to 1000±300 centipoise by adding extra amount of dimethoxy polysiloxane cyclics and amorphous silica respectively. Finally, 0.1 part by weight of dibutyltin dilaurate is added and mixed thoroughly.

EXAMPLE 2

A second electrical insulator coating composition was prepared by mixing 30 parts by weight of dimethyl polysiloxane fluid having a viscosity of 20,000 centipoise at 25° C. and 29 parts by weight of linear dimethyl polysiloxane of viscosity of 50 centipoise at 25° C., then adding 2 parts by weight of surface treated amorphous silica (surface treated with hexamethyldisilazane) having a specific gravity of 2.2 and surface area of about 150 $m^2/g$. Then 2 parts by weight of methyl tris-(methyl ethyl ketoxime)silane and 1 part by weight of N-(2-aminoethyl-3 aminopropyl)trimethoxy silane are added and mixed under nitrogen atmosphere. Then 35 parts by weight of alumina trihydrate are added and mixed well to uniform consistency. The viscosity of the mixture was checked and adjusted to 1000±300 centipoise by adding extra amount of dimethoxy polysiloxane linears and amorphous silica respectively. Finally, 0.1 part by weight of dibutyltin dilaurate is added and mixed thoroughly.

EXAMPLE 3

A solventless coating composition was prepared by mixing 46 parts by weight of polydimethylsiloxane fluid having viscosity of 2,000 centipoise and 4 parts by weight of surface treated amorphous silica (surface treated with hexamethyldisilazane) having specific gravity of 2.2 and surface area of about 130 $m^2/g$. Then 6 parts by weight of methyl tris-(methyl ethyl ketoxime)silane and 1 part by weight of N-(2-aminoethyl-3-aminopropyl)trimethoxy silane are added and mixed under nitrogen atmosphere. Then 40 parts by weight of alumina trihydrate were also added and mixed. To prepare a coating with desired colour 3 parts by weight of pigment paste were also added and mixed to a uniform consistency. The pigment paste was prepared by mixing 50 parts by weight of pigment powder into polydimethylsiloxane fluid. Finally 0.1 parts by weight of dibutyltin dilaurate is added and mixed thoroughly.
The finished product has a viscosity that makes it suitable for application by roller and brush. The coating can also be applied by spray application by heating in situ to a temperature of 70° C.

The composition prepared in accordance with Example 1 was coated on a number of 2 inch by 5 inch by 3/16 inch thick samples of GPO3 barrier material by dipping the samples to obtain an average coating thickness of 0.5±0.05 mm. One coated sample was exposed to 3000 hours UV light and compared to a control sample. There was only a very slight change in color of the sample exposed to UV light compared to the control sample, indicating good UV resistance.

Six samples of GPO3 barrier material coated as above were tested for inclined plane tracking in accordance with test method ASTM D2303. One sample tracked one inch at 880 minutes. Another sample started tracking at 920 minutes and had tracked about ¼ inch at 1000 minutes. The other four samples passed 1000 minutes with no tracking. Six control bare GPO3 samples were also tested and all six displayed tracking or slight erosion by 1000 minutes. The coating demonstrates superior resistance to tracking.

Four samples of GPO3 material coated as above were tested for arc resistance and all four samples passed the test of a minimum of 180 seconds.

A 25 kV insulator including 200 amp and 600 amp bushings was coated with a composition prepared in accordance with Example 1 and compared to an uncoated insulator and a vapor blasted insulator in a salt fog chamber test in accordance with IEC 507 testing method. During a test in which the salinity level was changed until acceptable results were achieved, the coated sample attained a salinity level almost three times that of the uncoated sample. The peak leakage current for the coated snmple during the test was 16 mA versus 40 mA for the uncoated sample and 80 mA for the vapor blasted sample.

A 25 kV insulator including 200 amp and 600 amp bushings was coated with a composition prepared in accordance with Example 1 and compared to an uncoated insulator in a tracking wheel test. There was no appreciable difference in performance between the coated and uncoated insulators.

The compositions of the present invention are useful in many instances where protection of surfaces of composite insulators against environmental effects is desired. These compositions include the compositions of the above examples as well as other compositions, the formulation of which is well within the skill of the ordinary workman in the art. The selection of the various components and their proportions would be immediately apparent depending upon the desired properties of the final coating. The compositions of the present invention overcome many of the problems associated with prior art compositions being a one part coating composition, which is easy to apply using any of the commonly employed methods and which is VOC free, thus satisfying the elimination or reduction in environmental pollution and potential danger to the health of workers caused by VOC containing compositions.

This invention relates to the use of a silicone mould or coating to form an exterior monolithic layer on a polymer-based composite high voltage insulator in order to reduce the negative and destructive effects on the insulator from phenomena such as environmental weathering, UV exposure, hydrolysis, electrical tracking, erosion of the polymer/brittle fracture of the composite insulator due to corona discharges and electrical arcing. Further, the exterior silicone layer works to increase the insulator's effective lifespan by improving its hydrophobic characteristics and suppression of leakage current.

The invention is effective in use with any type/geometry of all types of polymer-based composite insulators made of Silicone, EPDM (Ethylene Propylene Diene Monomer), ESP, EPR, Bisphenol Epoxy or Cycloaliphatic Epoxy type polymers.

Although not so limited, the invention provides a highly resilient, low cost high voltage insulator with a long lifespan for use on electrical transmission and distribution lines, as demanded, but currently unavailable, by users of such equipment.

While the invention has been described in reference to specific embodiments it should be understood by those skilled in the art that various changes can be made and The embodiments of the invention in which an exclusine property of privilege is claimed are as follows:

1. A method of protecting a composite high voltage insulators from the effects of a corrosive atmospheric environment comprising (1) applying to the surface of the composite insulator a thin layer of a one-part organopolysiloxane rubber composition comprising the product which is obtained by mixing the following:

a) from about 20 to about 60 weight percent of one or more polydiorganosiloxane fluids of the formula $$R''[(R)_2SiO]_n(R)_2SiR'$$

in which R is a monovalent alkyl or alkenyl radical having 1 to 8 carbon atoms or a phenyl radical, R' and R" which may be the same or different are OH or a monovalent alkyl or alkenyl radical having 1 to 8 carbon atoms or a phenyl radical and n has an average value such that the viscosity is from about 10 to about 100,000 centipoise at 25° C., wherein at least one of the polyorganosiloxane fluid has at least one of R' and R" equal to OH and n has an average value such that the viscosity is in the range from 100 to 100,000 centipoise at 25° C.

b) from 0 to about 40 weight percent of a cyclo-organosiloxane of the formula $$[(R)_2SiO]_n$$

in which R is a monovalent alkyl or alkenyl radical having 1 to 8 carbon atoms or a phenyl radical which may optionally be substituted with an alkyl radical having 1 to 8 carbon atoms and n has an average value of 3 to 10 c) from 0 to about 40 weight percent of an inorganic extending or non-reinforcing filler d) from about 0.5 to about 15 weight percent of an amorphous $SiO_2$ reinforcing filler having a surface area of between about 100 to 250 m²/g and a particle size range between about 0.01 and 0.03 microns;

e) from about 1 to about 10 weight percent of an oximinosilane cross-linking agent of the formula;

$$RSi(ON=CR'_2)_3$$

in which R and R' are independently selected from monovalent alkyl or alkenyl radicals having 1 to 8 carbon atoms or a phenyl radical which may optionally be substituted with an alkyl radical having 1 to 8 carbon atoms;

f) from about 0.2 to about 3 weight percent of an adhesion promoter of the formula $$(R^2O)_{3-b}SiR^1_{\phantom{1}}{}^{R^3_b}$$

in which $R^2$ and $R^3$ are independently selected from monovalent alkyl or alkenyl radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group;

g) from about 0.02 to about 3 weight percent of an organotin salt as a condensation catalyst; and h) from about 20 to about 50 weight percent of alumina trihydrate, the alumina trihydrate having a median particle size of about 10 μm to about 30 μm, containing 65.1 weight percent $Al_2O_3$, 34.5 weight percent combined $H_2O$, 0.3 weight percent $Na_2O$, 0.02 weight percent CaO, 0.01 weight percent $SiO_2$ and having a specific gravity of 2.42.

2. A method according to claim 1 wherein the one part organopolysiloxane rubber composition comprises:

a) about 30 weight percent of a hydroxyl terminated dimethyl polysiloxane fluid having a viscosity of 10,000 to 20,000 Centipoise at 25° C.;

b) about 2 weight percent of a mixture of amorphous and crystalline $SiO_2$ fillers having a specific gravity of 2.2 and surface area of up to about 130 m²/g;

c) about 2 weight percent of methyl tris-(methyl ethyl ketoxime)silane;

d) about 1 weight percent of N-(2 aminoethyl-3 aminopropyl)trimethoxysilane;

e) about 0.1 weight percent of dibutyltindilaurate;

f) about 29 weight percent of dimethylsiloxane cyclics; and g) about 0.8 weight percent of a gray pigment;

h) about 35 weight percent of alumina trihydrate, the alumina trihydrate having a median particle size of 13 μm, containing 65.1 weight percent $Al_2O_3$, 34.5 weight percent combined $H_2O$, 0.3 weight percent $Na_2O$, 0.02 weight percent CaO, 0.01 weight percent $SiO_2$ and having a specific gravity of 2.42.

3. A method according to claim 1 wherein n has an average value such that the viscosity is in the range from 1,000 to 40,000 centipoise at 25° C.

4. A method according to claim 3 wherein R is methyl.

5. A method according to claim 4 wherein the adhesion promoter is a compound of the formula $$\begin{array}{c}NHCH_2CH_2NH_2\\|\\CH_2\\|\\CH_2CH_2Si(OMe)_3\end{array}$$

wherein Me is a methyl radical.

6. A method according to claim 5 wherein the organotin salt is an organotin salt of a carboxylic acid selected from the group consisting of dibutyltindiacetate, stannous octoate and dibutyltindilaurate.

7. A method according to claim 6 wherein the organotin salt of a carboxylic acid is a compound of the formula $$(C_4H_9)_2Sn(OCOC_{10}H_{20}CH_3)_2.$$

8. A method according to claim 7 wherein the composition contains a first polydiorganosiloxane fluid wherein R is alkyl, R' and R' are each OH and n has an average value such that the viscosity is from about 1000 to 30,000 centipoise at 25° C. and a second polydiorganosiloxane fluid wherein R, R' and R" are each alkyl and the average value of n is between 4 and 20.

9. A method according to claim 8 wherein R of the first polydiorganosiloxane and R, R' and R" of the second polydiorganosiloxane are all methyl.

* * * * *